United States Patent [19]

Wu

[11] Patent Number: 5,975,109

[45] Date of Patent: Nov. 2, 1999

[54] RETAINING PIN PUMPER DEVICES OF THE TYPE HAVING A PIVOTAL LEVER FOR VARIOUS VALVES

[76] Inventor: Scott Wu, P.O. Box 63-247, Taichung, Taiwan

[21] Appl. No.: 09/232,403

[22] Filed: Jan. 15, 1999

[51] Int. Cl.[6] .............................. F16K 15/20; F16K 29/02
[52] U.S. Cl. ............................................ 137/231; 137/223
[58] Field of Search .................................... 137/223, 231; 285/312, 346

[56] References Cited

U.S. PATENT DOCUMENTS

| | | | |
|---|---|---|---|
| 1,854,797 | 4/1932 | Kirpatrick | 137/231 |
| 2,237,559 | 4/1941 | Jenne | 137/231 X |
| 3,926,205 | 12/1975 | Gourlet | 137/231 |
| 5,026,261 | 6/1991 | Jou | 285/312 X |
| 5,379,796 | 1/1995 | Wang | 137/231 |
| 5,666,990 | 9/1997 | Wu | 137/223 |
| 5,683,234 | 11/1997 | Chunag et al. | 137/223 X |
| 5,749,392 | 5/1998 | Glotin | 137/231 |
| 5,762,095 | 6/1998 | Gapinski et al. | 137/231 X |
| 5,785,076 | 7/1998 | You | 137/231 |
| 5,819,781 | 10/1998 | Wu | 137/231 |

Primary Examiner—John Rivell
Assistant Examiner—Meredith H. Schoenfeld

Attorney, Agent, or Firm—Alan Kamrath; Oppenheimer Wolff & Donnelly LLP

[57] ABSTRACT

A pumping device includes a main body having a passage defined therein through which air passes, a head connected to the main body, and a retainer slidably received in the head. The retainer includes a first compartment communicated with the passage. The second end of the retainer includes a conical recess defined therein, and a nozzle is slidably mounted in the second end of the retainer. A nozzle head is securely mounted in the second end of the head and includes a second compartment communicated with the first compartment via the nozzle. The nozzle head includes a hollow conical section for engaging with the conical recess of the retainer. A retaining pin is mounted in the first compartment and has a first end secured to the first end of the nozzle to slide therewith. A lever includes a first end pivotally connected to the first end of the head and a second operative end for switching the first end of the retaining pin and the retainer between a first operative position in which the first end of the lever bears against the first end of the retainer and the first end of the retaining pin and a second inoperative position in which the first end of the lever neither engages with the first end of the retainer nor engages with the first end of the retaining pin.

7 Claims, 7 Drawing Sheets

RETAINING PIN PUMPER DEVICES OF THE TYPE HAVING A PIVOTAL LEVER FOR VARIOUS VALVES

BACKGROUND OF THE INVENTION

1. Field of the Invention

The present invention relates to a retaining pin for pumping devices of the type having a pivotal lever for various valves to provide a more reliable retaining effect during pumping.

2. Description of the Related Art

U.S. Pat. No. 5,819,781 to Wu issued on Oct. 13, 1998 discloses a pumping device with a pivotal lever for various valves. However, problems are found during operation of the pumping device. No problem is found during pumping with an American valve when the spring 142 has a greater elasticity, yet the user has to apply a relatively large force to overcome the spring force when used on a French valve. On the other hand, no problem is found during pumping with a French valve when the spring 142 has a smaller elasticity, yet the spring force is insufficient to move the needle of the American valve extended into the compartment 152 of the nozzle head 15 such that inflation is impossible. The present invention is intended to provide a retaining pin to solve this problem.

SUMMARY OF THE INVENTION

A pumping device in accordance with the present invention comprises:

a main body having a passage defined therein through which air passes, a head connected to the main body and including a first end and a second end, a retainer slidably received in the head and including a first end, a second end, and a first compartment communicated with the passage, the second end of the retainer including a conical recess defined therein, a nozzle being slidably mounted in the second end of the retainer and including a first end and a second end, a nozzle head securely mounted in the second end of the head and including a second compartment defined therein and communicated with the first compartment via the nozzle, the nozzle head including a hollow conical section for engaging with the conical recess of the retainer, a retaining pin mounted in the first compartment and having a first end and a second end, the first end of the retaining pin being secured to the first end of the nozzle to slide therewith, and a lever having a first end pivotally connected to the first end of the head and a second operative end for switching the first end of the retaining pin and the retainer between a first operative position in which the first end of the lever bears against the first end of the retainer and the first end of the retaining pin and a second inoperative position in which the first end of the lever neither engages with the first end of the retainer nor engages with the first end of the retaining pin.

A spring is mounted in the first compartment of the retainer and attached between the first end of the nozzle and the first end of the retainer. The spring is mounted around a portion of the retaining pin. In a preferred embodiment of the invention, the first end of the nozzle includes an end face having an annular groove for receiving an end of the spring.

The head includes a third compartment defined therein, and the retainer includes a first transverse hole that communicates the first compartment of the retainer with the third compartment of the head. The retaining pin includes a second transverse hole that communicates with the first compartment of the retainer and an axial passage that communicates the second transverse hole with the second compartment of the nozzle head via the nozzle.

In a preferred embodiment of the invention, the first end of the lever includes a pivotal axis and an end face with a slot defined therein, the retaining pin being extendible into the slot. The first end of the lever further includes a cavity defined by an inner end wall face that faces away from the second operative end of the lever and a lateral inner wall face. A distance between the pivotal axis of the lever and the inner end wall face is greater than a distance between the pivotal axis and the inner lateral wall face. When a valve is extended into the second compartment of the nozzle head, the lever is switched to the operative position. The retainer is moved to hold the hollow conical section of the nozzle head. The retaining pin and the nozzle head are moved to open the valve in the nozzle head for inflation.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
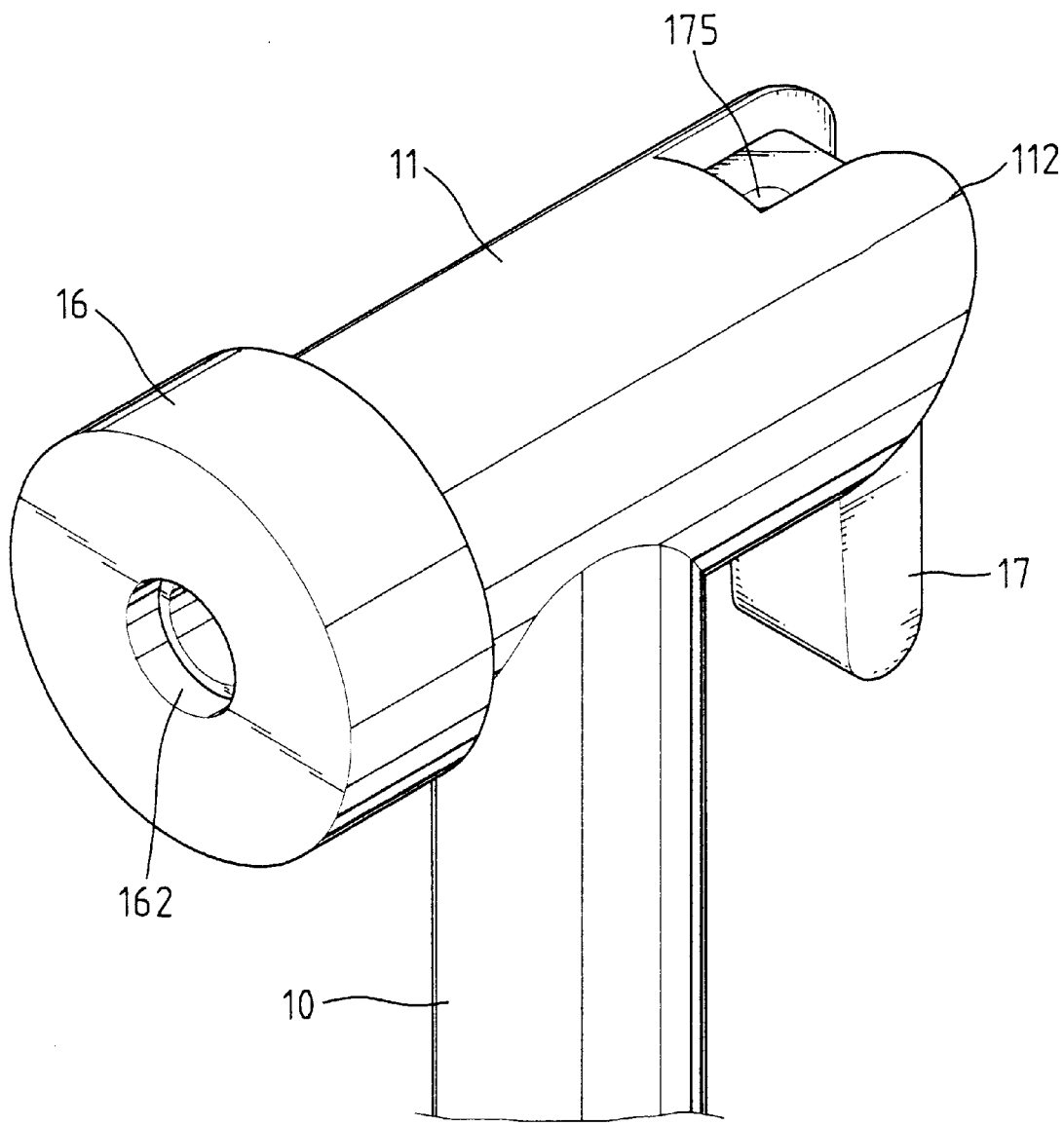
FIG. 1 is a perspective view of a portion of a pumping device in accordance with the present invention.
Figure 2:
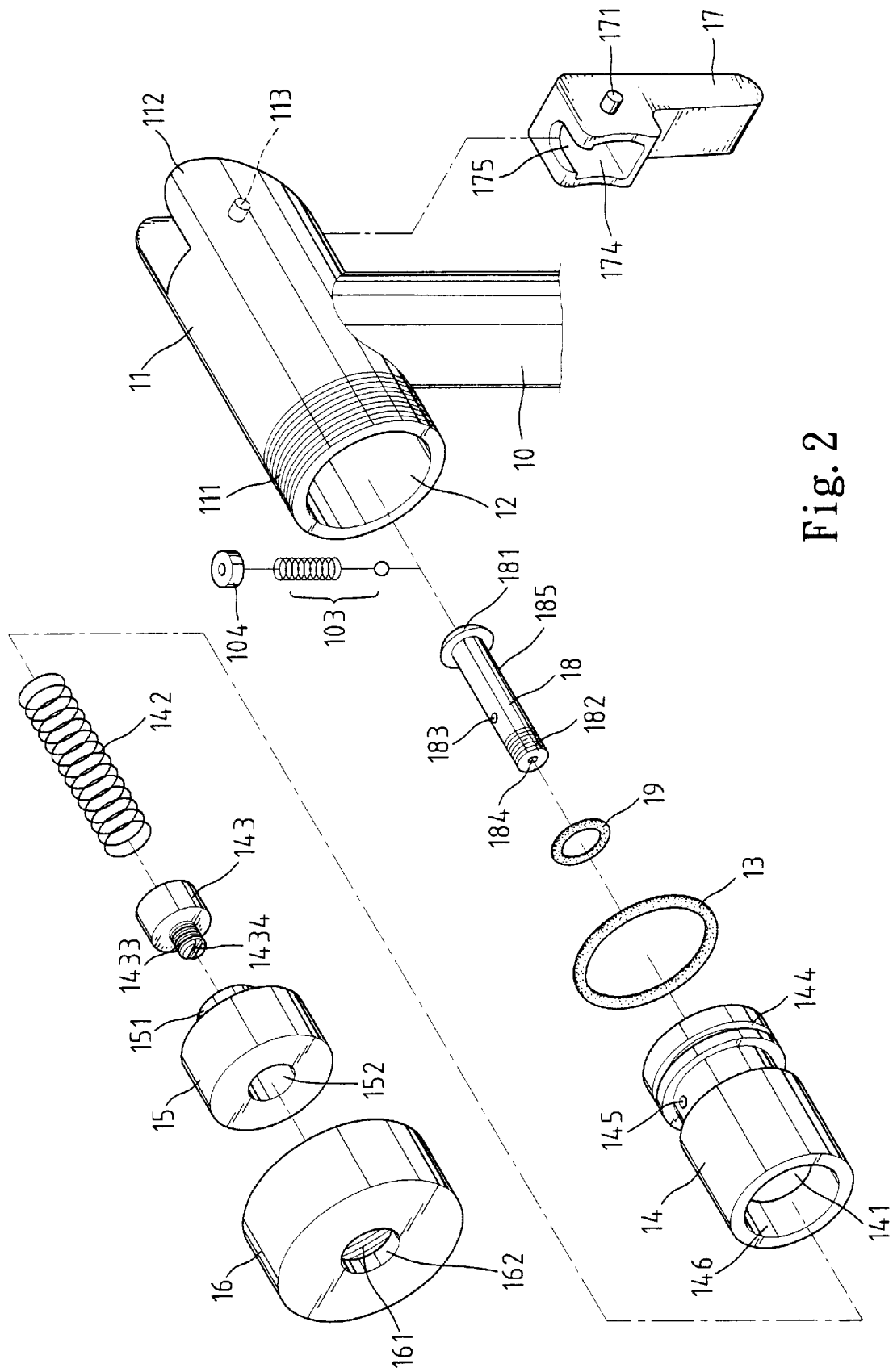
FIG. 2 is an exploded perspective view of a portion of the hand air pump.
Figure 3:
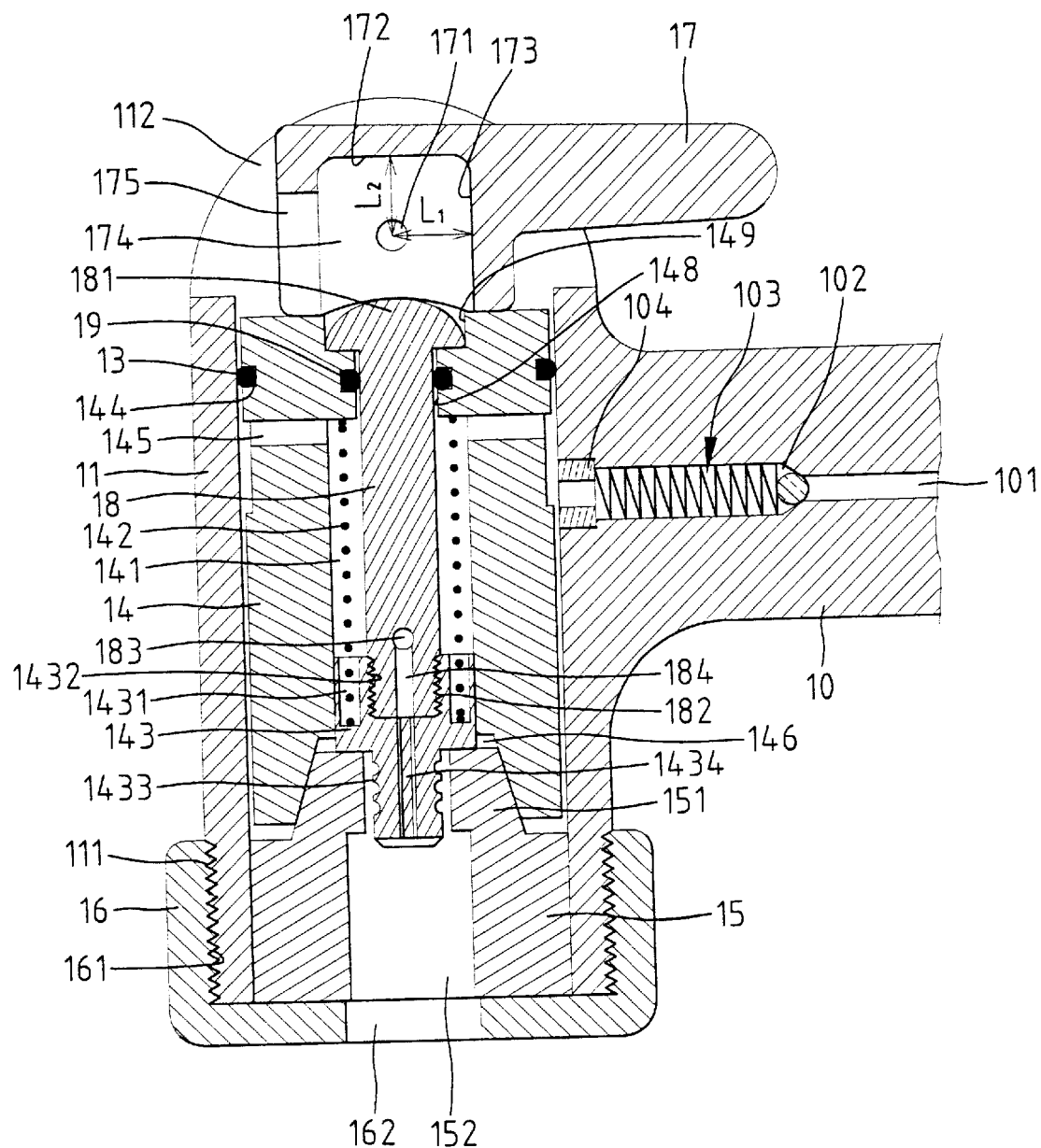
FIG. 3 is a sectional view of the portion of the pumping device.

Referring to FIGS. 1 to 3, a pumping device in accordance with the present invention is generally used for bicycles and includes a main body 10 having a passage 101 defined therein and a head 11 connected to the main body 10. It is appreciated that the passage 101 is communicated with a chamber (not shown) which receives a piston (not shown) therein for pumping air into the passage 101. Structure of the piston and the chamber and operation of the piston are conventional and therefore not described in detail.

As can be seen from FIG. 3, the passage 101 includes a check valve 103 mounted therein such that air is only flowable from the passage 101 to the head 11. In this embodiment, the passage 101 includes an enlarged section 102 adjacent to the head 11, and the check valves 103 includes a spring (not labeled), a ball (not labeled), and a holed cap 104 to which the spring bears against. The head 11 includes two lugs 112 formed on a first end thereof, and a lever 17 includes a first end having two aligned pivotal pegs 171 formed on opposite sides thereof and pivotally received in aligned holes 113 defined in the lugs 113. The first end of the lever 17 further includes a cavity 174 and a slot 175 defined in an end face thereof.

A retainer 14 is slidably received in the head 11 and includes a transverse hole 145 defined therein. The retainer 14 further includes an annular groove 144 for receiving an O-ring 13 for sealing purpose, best shown in FIG. 3. The retainer 14 further includes a compartment 141 which communicates with the transverse hole 145 and which receives a spring 142 and a nozzle 143 therein. The retainer 14 further includes a counterbore 149 defined in a first end thereof and communicated with the compartment 141 via a neck 148. The retainer 14 further includes a conical recess 146 defined in a second end thereof.

As can be seen from FIG. 3, the nozzle 143 includes a receptacle 1432 in an end face of a first end thereof. An annular groove 1431 is defined in the end face and around the receptacle 1432 for receiving an end of the spring 142. The other end of the spring 142 is attached to the first end of the retainer 14. A second end of the nozzle 143 includes a needle 1434 therein and a plurality of annular grooves 1433 defined in an outer periphery thereof. As can be seen from FIG. 3, the second end of the nozzle 143 extends in the conical recess 146 of the retainer 14.

A nozzle head 15, preferably of plastic material, is mounted in a second end of the head 11 and includes a compartment 152 that communicates with the compartment 141 of the retainer 14 and which may receive a valve of a bicycle tire which will be described later. The nozzle head 15 further includes a conical section 151 having an outer curvature complimentary to an inner curvature of the conical recess 146 of the retainer 14 so as to be fittingly received in the conical recess 146. As can be seen from FIG. 3, the conical section 151 is hollow so as to allow the second end of the nozzle 143 to extend.

An outer cap 16 is mounted to enclose the second end of the head 11 by threading engagement 161, 111. The outer cap 16 includes an opening 162 through which the valve of the bicycle may pass. The lever 17 is pivotally mounted between the lugs 112, in which a distance $L_1$ between the pivotal axis of the lever 17 and an inner end wall face 173 that defines a portion of the cavity 174 and that faces away from the second operative end of the lever 17 is greater than a distance $L_2$ between the pivotal axis and an inner lateral wall face 172 that defines a portion of the cavity 174.

The pumping device in accordance with the present invention further includes a retaining pin 18. Referring to FIGS. 2 and 3, the retaining pin 18 includes a stem 185 and an enlarged head 181. An outer threading (not labeled) is formed on a distal end 182 of the stem 185 to engage with inner threading (not labeled) defined in an inner periphery that defines the receptacle 1432 of the nozzle 143. As a result, the nozzle 143 is secured to the retaining pin 18 to slide therewith. The stem 185 includes an axial passage 184 that communicates with the nozzle 143 and a transverse hole 183 that communicates the compartment 141 of the retainer 14 with the axial passage 184.

Figure 4:
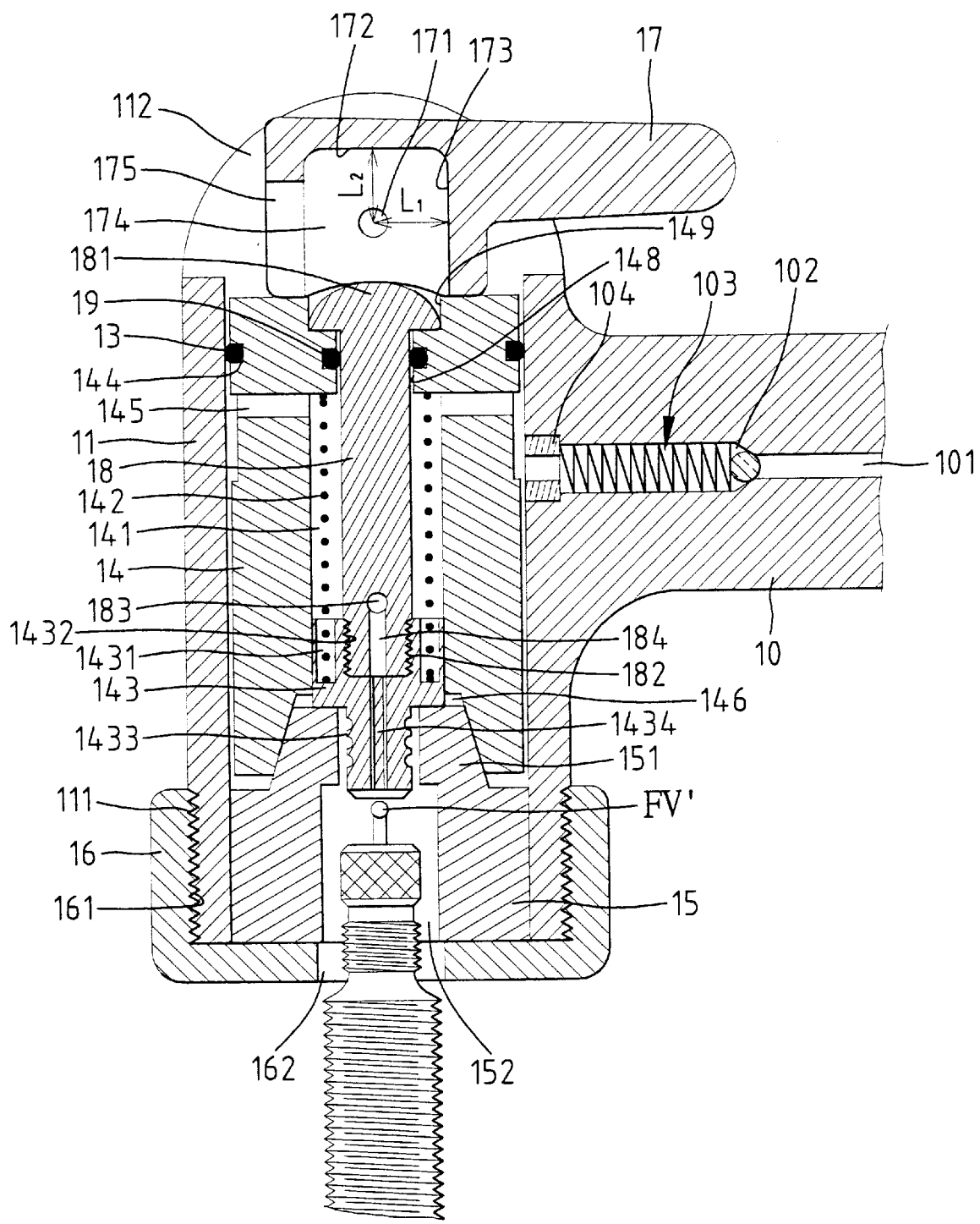
FIG. 4 is a sectional view similar to FIG. 3, illustrating operation of the pumping device on a French valve, wherein the lever is in an inoperative position.
Figure 5:
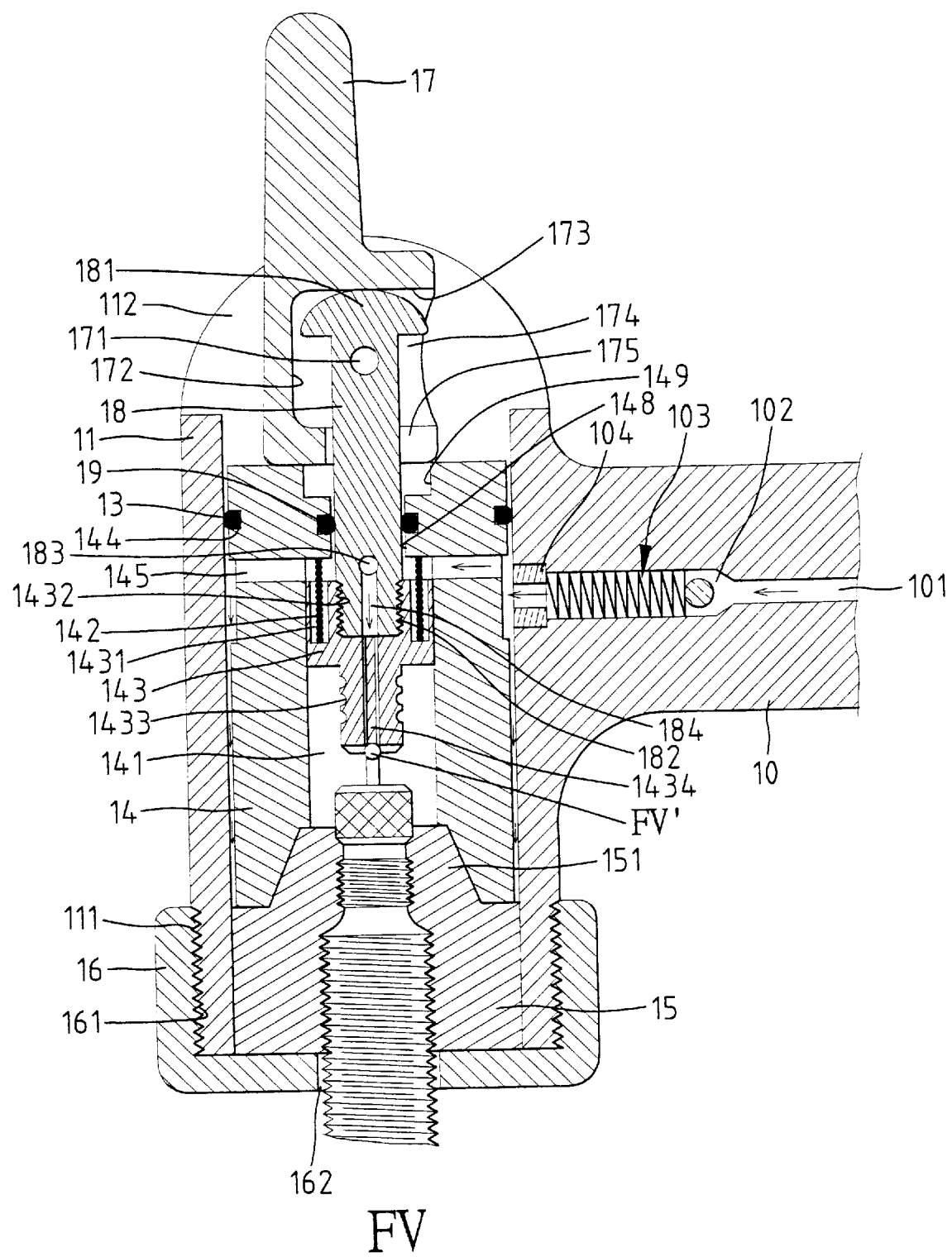
FIG. 5 is a sectional view similar to FIG. 4, wherein the lever is in an operative position.

In use, referring to FIG. 4, when pumping a tire (not shown) via a French valve FV, the French valve FV is extended into the compartment 152 of the nozzle head 15 and moves the nozzle 143 and the retaining pin 18 toward the lever 17. The lever 17 is then pivoted, e.g., counterclockwise through 90 degrees to a position shown in FIG. 5. The slot 175 of the lever 17 is sized to allow the stem 185 of the retaining pin 18 to pass therethrough. Since $L_1$ is greater than $L_2$, the retainer 14, the retaining pin 18, and the nozzle 143 are both moved toward the French valve FV by a distance $L_1-L_2$, such that the conical recess 146 of the retainer 14 is completely filled by the conical section 151 of the nozzle head 15. In addition, the needle 1434 of the nozzle 143 bears against a needle FV' of the French valve FV. Air from the passage 101 (under reciprocating motion of the above-mentioned piston) enters the French valve FV via the transverse hole 145, the transverse hole 183, the axial passage 184, and the nozzle 143. During the inflation procedure, air from the passage 101 also enters a space between an inner periphery of the head 11 and an outer periphery of the retainer 14. The air pressure in the space is increased during the inflation procedure such that the French valve FV is tightly clamped by the elastic nozzle head 15, as the air pressure exerts an inward force on the conic section 151 of the nozzle head 15. It is appreciated that the enlarged head 181 of the retaining pin 18 bears against the inner end wall face 173 to reliably push the needle 1434 of the nozzle 143 for opening the French valve FV.

Figure 6:
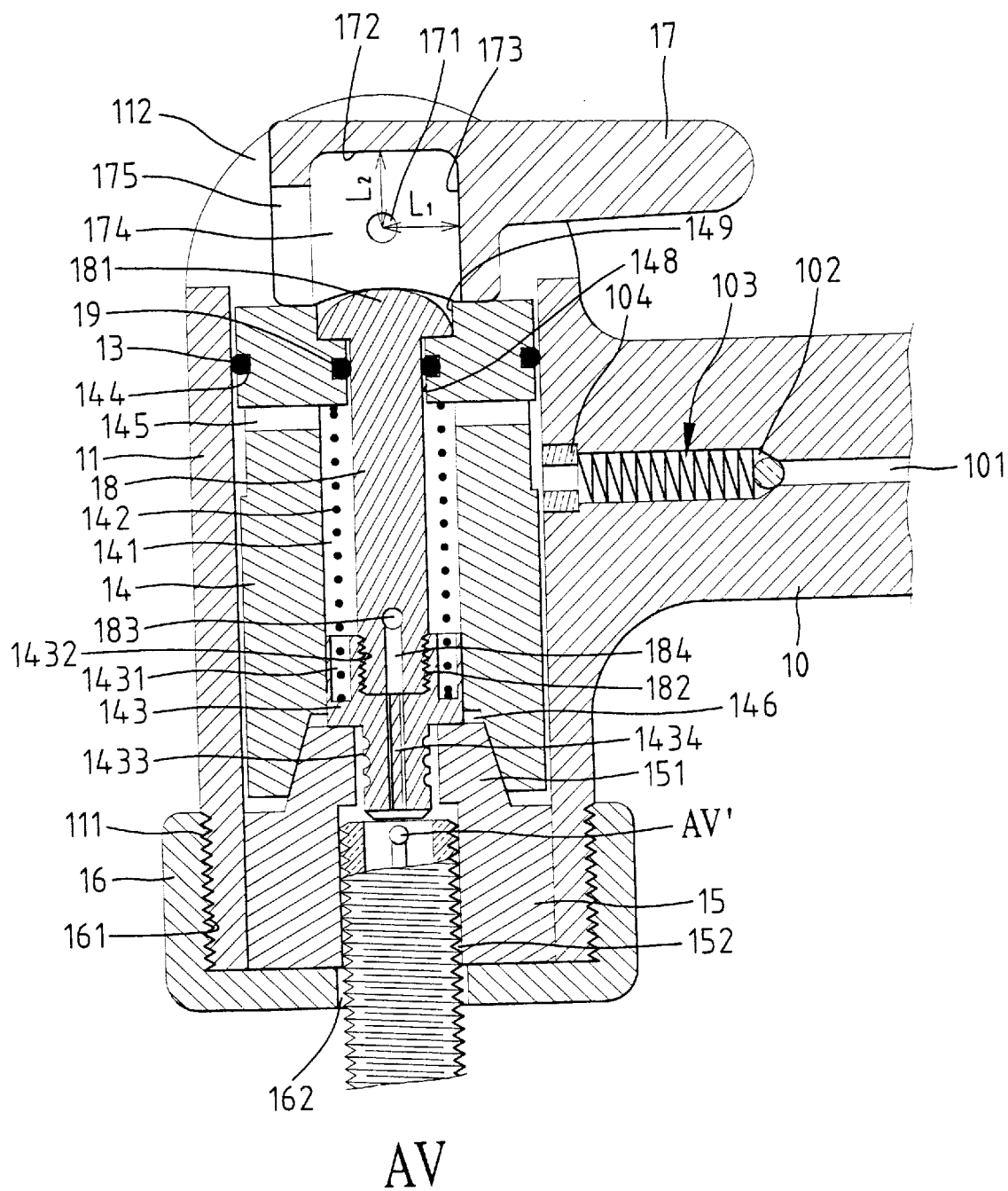
FIG. 6 is a sectional view similar to FIG. 4, illustrating operation of the pumping device on an American valve, wherein the lever is in an inoperative position.
Figure 7:
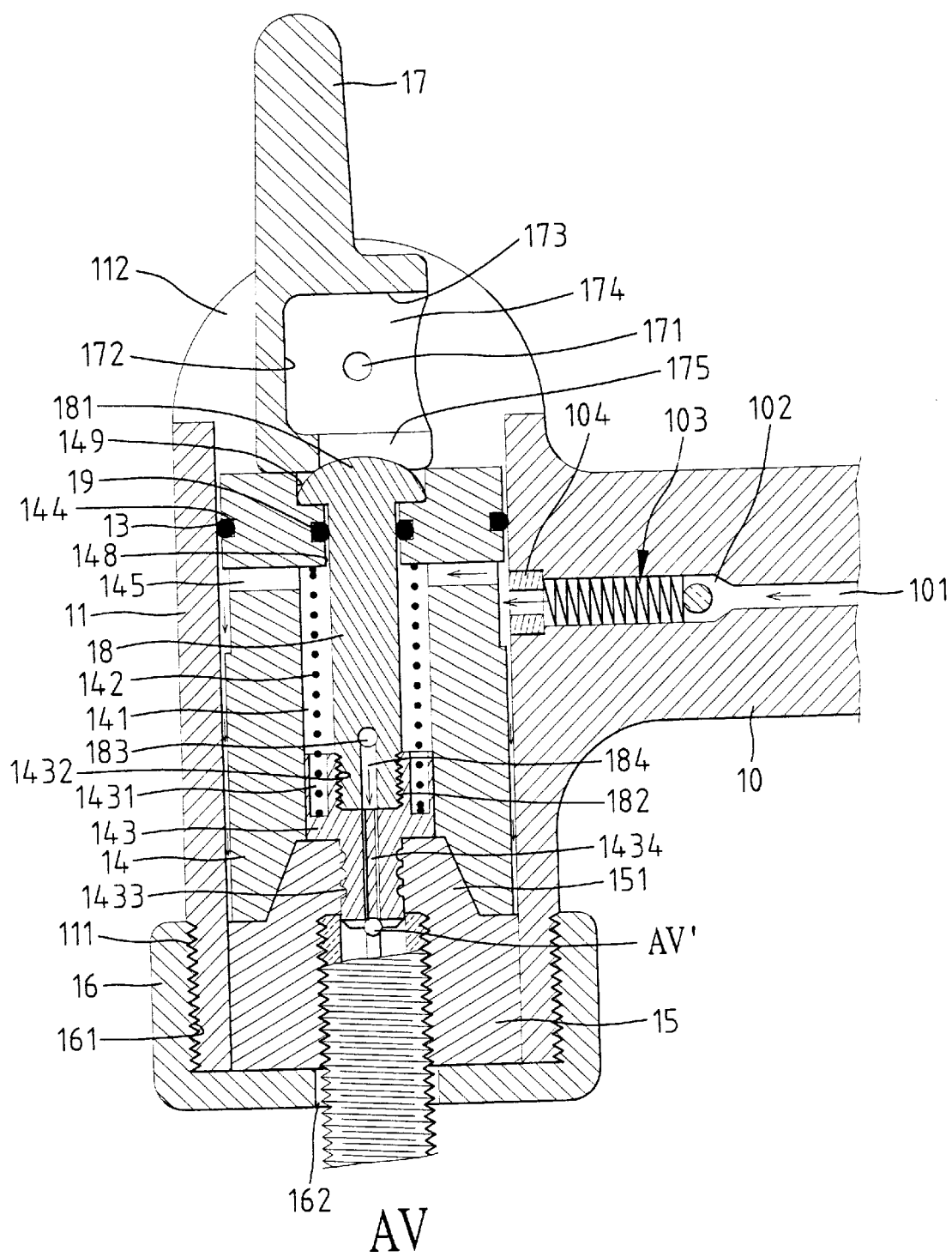
FIG. 7 is a sectional view similar to FIG. 6, wherein the lever is in an operative position.

Referring to FIG. 6, when pumping a tire (not shown) via an American valve AV, the American valve AV is extended into the compartment 152 of the nozzle head 15, yet the nozzle 143 and the retaining pin 18 are not moved, as the American valve AV is shorter than the French valve FV. The lever 17 is pivoted, e.g., counterclockwise through 90 degrees to bear against the retainer 14 and the enlarged head 181 of the pin 18, as shown in FIG. 7. Since $L_1$ is greater than $L_2$, the retainer 14, the retaining pin 18, and the nozzle 143 are moved toward the American valve AV by a distance $L_1-L_2$, such that the conical recess 146 of the retainer 14 is completely filled by the conical section 151 of the nozzle head 15. In addition, the needle 1434 of the nozzle 143 bears against a needle AV' of the American valve AV. Air from the passage 101 (under reciprocating motion of the above-mentioned piston) enters the American valve AV via the transverse hole 145, the compartment 141, the transverse hole 183, the axial passage 184, and the nozzle 143. During the inflation procedure, air from the passage 101 also enters a space between the inner periphery of the head 11 and the outer periphery of the retainer 14. The air pressure in the space is increased during the inflation procedure such that the American valve AV is tightly clamped by the elastic nozzle head 15, as the air pressure exerts an inward force on the conic section 151 of the nozzle head 15. It is appreciated that the enlarged head 181 of the retaining pin 18 is reliably retained in the counterbore 149 of the retainer 14 by the end face of the lever 17 during inflation. This may reliably push the needle 1434 of the nozzle 143 for opening the American valve AV.

It is found that operation of the pumping device in accordance with the present invention on both French valve FV and American valve AV is easy and simple without any difficulty by provision of the retaining pin 18 that reliably overcomes the spring force of the spring 142.

Although the invention has been explained in relation to its preferred embodiment, it is to be understood that many other possible modifications and variations can be made without departing from the spirit and scope of the invention as hereinafter claimed.

What is claimed is:

1. A pumping device comprising:
   a main body having a passage defined therein through which air passes,
   a head connected to the main body and including a first end and a second end,
   a retainer slidably received in the head and including a first end, a second end, and a first compartment communicated with the passage, the second end of the retainer including a conical recess defined therein, a nozzle being slidably mounted in the second end of the retainer and including a first end and a second end, a nozzle head securely mounted in the second end of the head and including a second compartment defined therein and communicated with the first compartment via the nozzle, the nozzle head including a hollow conical section for engaging with the conical recess of the retainer, a retaining pin mounted in the first compartment and having a first end and a second end, the first end of the retaining pin being secured to the first end of the nozzle to slide therewith, and a lever having a first end pivotally connected to the first end of the head and a second operative end for switching the first end of the retaining pin and the retainer between a first operative position in which the first end of the lever bears against the first end of the retainer and the first end of the retaining pin and a second inoperative position in which the first end of the lever neither engages with the first end of the retainer nor engages with the first end of the retaining pin.

2. The pumping device as claimed in claim 1, further comprising a spring mounted in the first compartment of the retainer and attached between the first end of the nozzle and the first end of the retainer.

3. The pumping device as claimed in claim 2, wherein the spring is mounted around a portion of the retaining pin.

4. The pumping device as claimed in claim 3, wherein the first end of the nozzle includes an end face having an annular groove for receiving an end of the spring.

5. The pumping device as claimed in claim 1, wherein the head includes a third compartment defined therein, and the retainer includes a first transverse hole that communicates the first compartment of the retainer with the third compartment of the head.

6. The pumping device as claimed in claim 5, wherein the retaining pin includes a second transverse hole that communicates with the first compartment of the retainer and an axial passage that communicates the second transverse hole with the second compartment of the nozzle head via the nozzle.

7. The pumping device as claimed in claim 1, wherein the first end of the lever includes a pivotal axis and an end face with a slot defined therein, the retaining pin being extendible into the slot, the first end of the lever further including a cavity defined by an inner end wall face that faces away from the second operative end of the lever and a lateral inner wall face, wherein a distance between the pivotal axis of the lever and the inner end wall face is greater than a distance between the pivotal axis and the inner lateral wall face.

* * * * *

UNITED STATES PATENT AND TRADEMARK OFFICE
CERTIFICATE OF CORRECTION

PATENT NO : 5,975,109

DATED : November 2, 1999

INVENTOR(S) : Scott Wu

It is certified that error appears in the above-identified patent and that said Letters Patent are hereby corrected as shown below:

Cover page, after "[22] Filed Jan. 15, 1999" insert:

-- [30] Foreign Application Priority Data

July 24, 1998 [TW] Taiwain . . . . 87212038 --.

Signed and Sealed this

Third Day of April, 2001

*Attest:*

NICHOLAS P. GODICI

*Attesting Officer*    *Acting Director of the United States Patent and Trademark Office*